G. B. KISSINGER.
PIPE COUPLING.
APPLICATION FILED JUNE 27, 1911.
1,026,211.
Patented May 14, 1912.
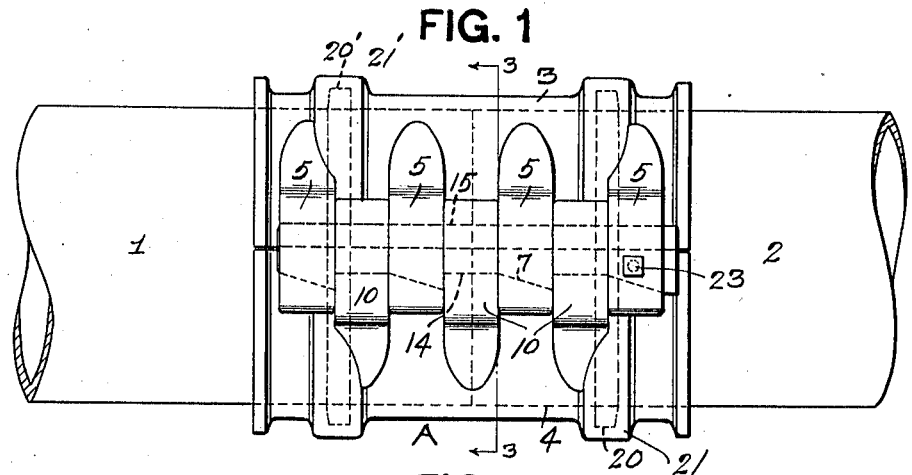
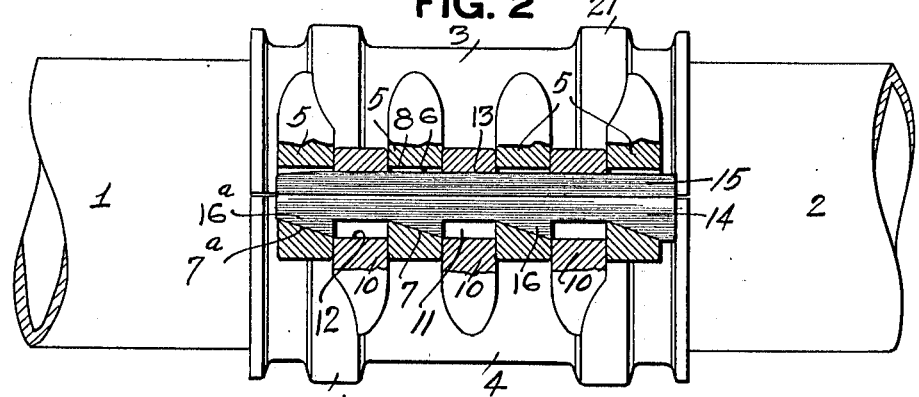
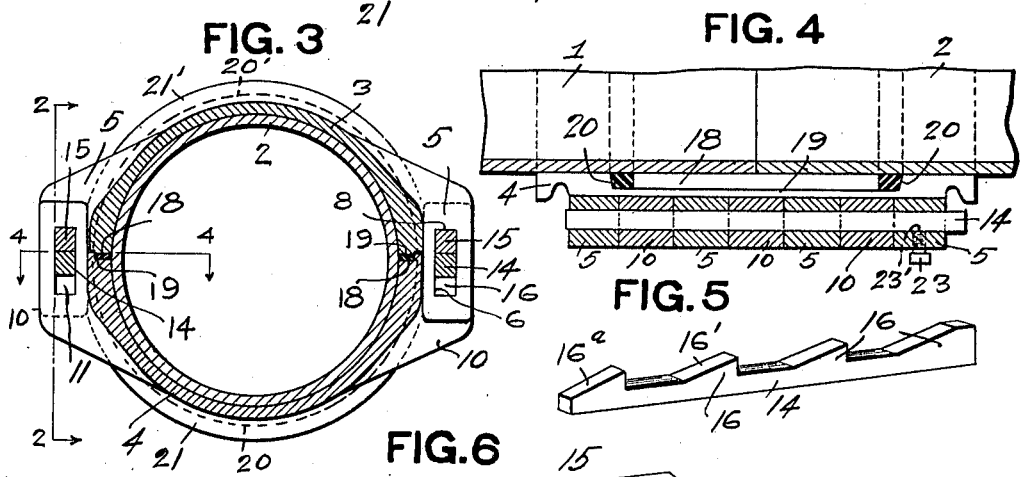
WITNESSES.
INVENTOR.
George B. Kissinger

UNITED STATES PATENT OFFICE.

GEORGE B. KISSINGER, OF ASPINWALL, PENNSYLVANIA.

PIPE-COUPLING.

1,026,211.  Specification of Letters Patent.  Patented May 14, 1912.

Application filed June 27, 1911. Serial No. 635,695.

*To all whom it may concern:*

Be it known that I, GEORGE B. KISSINGER, a citizen of the United States, and resident of Aspinwall, in the county of Allegheny and State of Pennsylvania, have invented a new and useful Improvement in Pipe-Couplings; and I do hereby declare the following to be a full, clear, and exact description thereof.

My invention relates to pipe couplings, and more particularly to such couplings or joints used in uniting the ends of sections of pipe or tube which are not threaded. Its object is to provide an improved and simple device of this nature which can be readily applied to unite the ends of oil or gas pipes, and particularly those of large diameter used in the field in connection with oil or gas wells or permanently laid in pipe lines for this or similar purposes, my invention being particularly applicable to repair work also, as by it the adjoining ends of two pipe sections which are not provided with threads or flanges can be quickly and durably united in a sealed joint.

A further specific object of my invention is to improve on prior devices in which two semi-cylindrical separate members or parts pivotally connected on one side only, are united by driving a wedge or wedges through interlocking hooks or lugs, the said devices being in general open to the objection of uneven pressure at the entrance and inner ends of the wedges employed, so as to provide a joint of uneven tension about the pipe ends.

To these ends my invention contemplates the use of two co-acting semi-cylindrical members adapted to embrace the ends of the pipe sections, one of said members being provided along one side with a series of lugs having slots therethrough, and the other member having one or more lugs adapted to interregister between said lugs and provided with slots arranged to longitudinally register with aforesaid slots, the said slots being inclined or having inclined faces along one edge, a key adapted to be inserted longitudinally of the pipe sections through all of said longitudinal registering slots and provided with serrations or inclined teeth arranged to engage with said inclined faces, and a filling member or shim insertible within said slots to fill the same with said key, so that the keying means including the serrated and the filling member can be driven longitudinally of the slots, the serrations on the key moving along the inclined faces of the slots to draw the semi-cylindrical members together. In carrying out my invention the above arrangement is preferably provided on each side of each semi-cylindrical member, although it is clear that other equivalent means for holding or engaging the members may be provided along one side, so long as my improved construction is used to tightly fasten the members along the other side, without departing from the spirit of my invention.

In the accompanying drawings Figure 1 is a side view of a pipe coupling illustrating my invention. Fig. 2 is another side view of the same partly in longitudinal or vertical section on the line 2—2 Fig. 3, through the registering lugs. Fig. 3 is a transverse section on the line 3—3 Fig. 1. Fig. 4 is a detail longitudinal section partly broken away through the registering lugs showing the key therein. Fig. 5 is a detail perspective view of the key, and Fig. 6 a like view of the filler piece.

In the said drawings the reference numerals 1, 2 designate the adjoining ends of any pipe or tube sections. The said sections are shown engaged by the two semi-cylindrical members 3, 4 of the pipe coupling or joint A illustrated. The member 3 is provided, along both sides preferably, with the sidewise arranged and depending (as illustrated) lugs 5, a series of four of such lugs being shown. Each lug 5 is provided with a slot 6 extending therethrough longitudinally relative to the pipe sections 1, 2. Each slot 6 has an inclined lower face or edge 7, its upper face 8 being substantially flat or parallel to the axis of the coupling. The member 4 is provided, also along each side, with a lug or finger 10 between each pair of lugs 5 on the member 3, thus the drawing illustrating 3 of such lugs 10. Each lug 10 is provided with a slot 11 extending through the lug longitudinally of the coupling and arranged to longitudinally register in substantial alinement with the slot 6 of the members 8 when the lugs 5, 10 are respectively in register in applying the coupling 3, 4 to the pipe sections 1, 2. The lower face 12 of the slot 11 may be flat or parallel to the upper face 13 of said slot, as shown, or of any desired form so long as its admits of the entrance of the fastening means as described below. The said fastening means comprises the serrated key 14 and the filler piece or shim 15. The key 14 is provided with the inclined teeth or serrations 16 corresponding in number to the lugs 5, each inclined tooth having a sloping face 16' at a similar angle to the axis of the key to the inclination of the face 7 of the slot 6 relative to the axis of the coupling. The filler piece or shim 15 is substantially constant in thickness throughout nearly its entire length, being however, preferably tapered at its end 17, as illustrated.

One of the members 3 is provided preferably with the longitudinally extending gaskets engaging edge 19, as illustrated clearly in Fig. 3. The member 4 is preferably provided with the transversely or circularly extending gaskets 20 carried preferably within the flanges 21, and the member 3 is provided with the like gaskets 20' within the flanges 21' which register with the gasket 20 when the members 3, 4 are fastened together about the pipe section.

In applying the coupling of my invention to unite the two adjoining pipe sections 1, 2, the parts or members 3, 4 are first clasped over the ends of the pipe sections, the lugs 5 of the member 3 being passed between the lugs 10 of the member 4, and the slots 6, 11 of the lugs 5, 10 coming into substantial alinement. The serrated key 14 is then inserted longitudinally of the said slots through the same, the depth or thickness of the slots 7 and the faces 8 being sufficient to admit the key, which is seated with its inclined teeth 16 resting upon or against the inclined faces 7 of the said slot 6 when the key has been fully inserted, or more properly speaking, inserted far enough to bring the foremost inclined teeth 16ª into register with the outermost face 7ª. The filler piece or shim 15 is then inserted in the space within the slots above the key 14; and the key and filler piece driven home so as to cause the inclined teeth 16 to ride up against the inclined faces 17 and thereby forcibly draw the members 3, 4 together to form a tight sealed joint. The friction of the parts will in general be found sufficient to hold the key in place, but in order to insure a permanent joint I provide preferably the screw bolt 23 in one of the lugs 5 of the member 3, the said bolt having a pointed or tapered end 23' which engages forcibly with the metal of the key 14 to hold it into final driven position.

The gaskets 18, 20 and 20', which are compressed between the mating ends of the members 3, 4 and the said members and the pipe sections 1, 2, respectively, serve to entirely prevent leakage of the contents of the pipe sections through the joint.

By the use of my invention the two members 3, 4 are drawn together evenly throughout their length, as a sufficient number of inclined teeth 16 are provided preferably on the key 14, and a corresponding sufficient number of lugs having inclined slots 7 are provided on the member 3 to insure the taking or drawing together of the members 3, 4, to the same extent at one end as the other.

What I claim is:

1. In pipe couplings, the combination of two members adapted to embrace adjoining pipe sections and provided with fastening means along one side, one of said members having a plurality of lugs along its other side provided with slots, and the other member having lugs disposed respectively between successive lugs of the first named member and provided with inclined slots, a key insertible longitudinally of said slots, and provided with inclined teeth registering with said inclined slots, and a filler piece insertible within said slots and coöperating with said key to hold said members in mutually contracted position when said key is driven further into said slots, substantially as described.

2. In pipe couplings, the combination of two members, adapted to embrace adjoining pipe sections and provided with fastening means along one side, one of said members having a plurality of lugs along its other side provided with slots, and the other member having lugs disposed respectively between successive lugs of the first member and provided with inclined slots, a key insertible longitudinally of said slots, and provided with inclined teeth registering with said inclined slots, means for filling said slots coöperating with said key to draw said members together when said key is forced further longitudinally of said slots, and means for holding said key in final position.

3. In pipe couplings, the combination with two semi-cylindrical members adapted to grip the ends of adjoining pipe sections, each of said members having a plurality of lugs along both sides thereof, the lugs of one member being registerable between the lugs of the other member, all of said lugs being provided with slots, the slots of opposite members registering with each other when the members are applied to the pipe sections, the slots of the one member having inclined faces, keys having inclined teeth insertible on the respective sides of said members through said slots, and a filler piece substantially filling said slots when said key is in inserted position.

4. In pipe couplings, the combination with two semi-cylindrical members adapted to grip the ends of adjoining pipe sections, each of said members having a plurality of lugs along both sides thereof, the lugs of one member being registerable between the lugs of the other member, all of said lugs being provided with slots the slots of opposite members registering with each other when the members are applied to the pipe sections, the slots of the one member having inclined faces, keys having inclined teeth insertible on the respective sides of said members through said slots, and a filler piece substantially filling said slots when said key is in inserted position, said filler piece having a tapered forward end and one of said members having a screw bolt adapted to engage said key after said filler piece and key have been driven home, substantially as described.

5. In pipe couplings, the combination with two semi-cylindrical members adapted to grip the ends of adjoining pipe sections, each of said members having a plurality of lugs along both sides thereof, the lugs of one member being registerable between the lugs of the other member, all of said lugs being provided with slots, the slots of opposite members registering with each other when the members are applied to the pipe sections, the slots of one member having inclined faces, keys having inclined teeth insertible on the respective sides of said members through said slots, and a filler piece substantially filling said slots when said key is in inserted position, each of said members being provided with a pair of transversely extending gaskets registering with the like gaskets of the other member, and one of said members being provided with a longitudinal gasket along the meeting faces of the members.

In testimony whereof, I the said GEORGE B. KISSINGER have hereunto set my hand.

GEORGE B. KISSINGER.

Witnesses:
Wm. A. Steinmeyer,
John F. Will.

Copies of this patent may be obtained for five cents each, by addressing the "Commissioner of Patents, Washington, D. C."